UNITED STATES PATENT OFFICE.

JOSEF KIRCHMANN AND KASPAR SCHWINGHAMMER, OF MUNICH, GERMANY.

COMPOSITION FOR FURNACE-WALLS.

SPECIFICATION forming part of Letters Patent No. 529,450, dated November 20, 1894.

Application filed October 18, 1892. Serial No. 449,253. (No specimens.)

*To all whom it may concern:*

Be it known that we, JOSEF KIRCHMANN and KASPAR SCHWINGHAMMER, of Munich, Bavaria, Germany, have invented certain new and useful Improvements in Compositions for Furnace-Walls, of which the following is a specification.

The present invention relates to compositions for furnace walls and other masonry exposed to a high degree of heat and its object is to render such walls and masonry fire-proof even under the most intense heat. For this purpose, our invention consists in the composition of matter and process of making the same, as hereinafter described and pointed out in the claims.

The following compositions are what we consider the best embodiments of our invention.

Walls which are exposed to a higher temperature are formed of fire-clay, (*e. g.*, chamotte,) or infusorial earth, or magnesia, graphite and asbestos, with a cementing or binding agent, consisting of acetic acid combined with iron filings or iron forge-scales, the acetic acid being added to the iron filings until the resultant acetate of iron is completely or only partly dissolved. Instead of the latter cementing medium, a solution of borax or chloride of sodium may be employed. Liquid-silex may also be used for this purpose, but only when the mass is employed in places not exposed to excessive temperature. A mass composed as follows yields excellent results: two parts fire-clay or chamotte, one part graphite, one part asbestos, with a binding or cementing medium of acetic acid and iron filings. Instead of this compound, a mass composed as follows may be used with advantage, especially for walls exposed less intensely to the action of the products of combustion: silica, common clay (kieselguhr) or quartz-sand, barytes or fluor-spar powder, cryolite together with a binding medium of liquid silex, solution of borax or common salt, or gypsum (the latter only for walls exposed to a very low temperature); the said ingredients being used either alone or mixed, and with or without the addition of coal-ashes or slag-powder. Coal-ashes or powdered-slags or clinkers may be added to every mixture, including those employed for high temperatures. The higher the degree of resistance to the action of the fire desired, the greater will evidently be the amount of fire-clay, graphite or asbestos added. A mass for moderately high temperatures is made from quartz-sand, powdered slags, asbestos, fluor-spar, cryolite, with liquid silex or cement as a binding medium; or it may be composed of clay, kieselguhr or quartz (or powdered slags, coal-ashes) with one of the named binding mediums.

Having thus described our invention, what we claim, and desire to secure by Letters Patent, is—

1. The method of producing fire-proof compositions for furnace walls, which consists in adding acetic acid to iron filings or forge-scales, and then adding the cementing medium thus produced to a compound containing fire-clay or chamotte, together with graphite and asbestos, substantially as set forth.

2. A fire-proof composition for furnace walls, containing fire-clay or chamotte, graphite and asbestos, in combination with a cementing medium containing acetate of iron, substantially as set forth.

3. A fire-proof composition for furnace walls, consisting of the following ingredients, in the proportions substantially as specified: slag-powder or coal-ashes, fire-clay or chamotte, graphite, asbestos, magnesia, quartz-sand, fluor-spar, hepatite and cryolite, in combination with a binding or cementing medium, substantially as set forth.

4. A fire-proof composition for furnace walls, consisting of the following ingredients, in the proportions substantially as specified: slag-powder or coal-ashes, fire-clay or chamotte, graphite, asbestos, magnesia, quartz-sand, fluor-spar, hepatite and cryolite, in combination with a binding or cementing medium containing acetate of iron, substantially as set forth.

In testimony that we claim the foregoing as our invention we have signed our names in presence of two subscribing witnesses.

JOS. KIRCHMANN.
KASPAR SCHWINGHAMMER.

Witnesses:
ALBERT WEICKMAN,
CARL MAYER.